(12) United States Patent
Bosko

(10) Patent No.: US 8,539,973 B2
(45) Date of Patent: Sep. 24, 2013

(54) PRESSURE-ACTUATED NORMALLY OPEN FLUID VALVE

(75) Inventor: Robert Bosko, Blind Bay (CA)

(73) Assignee: Robert S. Bosko, Blind Bay, British Columbia (CA)

( * ) Notice: Subject to any disclaimer, the term of this patent is extended or adjusted under 35 U.S.C. 154(b) by 1319 days.

(21) Appl. No.: 10/583,825

(22) PCT Filed: May 16, 2005

(86) PCT No.: PCT/IB2005/004179
§ 371 (c)(1),
(2), (4) Date: Jun. 2, 2009

(87) PCT Pub. No.: WO2006/087606
PCT Pub. Date: Aug. 24, 2006

(65) Prior Publication Data
US 2009/0272922 A1    Nov. 5, 2009

Related U.S. Application Data

(60) Provisional application No. 60/571,339, filed on May 15, 2004, provisional application No. 60/571,828, filed on May 17, 2004.

(51) Int. Cl.
*F15B 13/00*    (2006.01)
*F16K 31/00*    (2006.01)
*F16K 31/02*    (2006.01)

(52) U.S. Cl.
USPC ......... 137/271; 137/269; 251/14; 251/129.03

(58) Field of Classification Search
USPC .............. 251/14, 129.03; 137/269, 271
See application file for complete search history.

(56) References Cited

U.S. PATENT DOCUMENTS

| | | | | |
|---|---|---|---|---|
| 4,898,203 A | * | 2/1990 | Kobelt | 137/269 |
| 4,986,299 A | * | 1/1991 | Schultz | 137/269 |
| 5,348,043 A | * | 9/1994 | Chimera | 137/269 |
| 5,439,021 A | * | 8/1995 | Burlage et al. | 137/84 |
| 6,805,158 B2 | * | 10/2004 | Ejiri | 137/557 |
| 7,063,103 B2 | * | 6/2006 | Guler et al. | 137/269 |
| 7,458,386 B2 | * | 12/2008 | Zhang | 137/15.18 |
| 7,549,436 B2 | * | 6/2009 | Parsons et al. | 137/15.18 |
| 7,607,448 B2 | * | 10/2009 | Hawks et al. | 137/15.18 |
| 7,841,358 B2 | * | 11/2010 | Hillesheim et al. | 137/269 |

* cited by examiner

*Primary Examiner* — Ryan Reis
(74) *Attorney, Agent, or Firm* — Stout, Uxa, Buyan & Mullins, LLP

(57) ABSTRACT

A normally open non-electric valve includes a flow path through an apertured valve seat . . . cavity isolated from the flow path is sealingly closed off adjacent the valve seat by a flexible diaphragm. The diaphragm is sufficiently flexible to be pushed and held away from the valve seat by fluid flowing in the flow path. When it is desired to close the valve, a pressure medium is introduced into the cavity so as to force the diaphragm against the valve seat and interrupt the fluid flow in the flow path. The normally open valve can inexpensively be converted from an inexpensive electric solenoid valve by removing the plunger, spring and coil from the electric valve, closing off the plunger cavity with a flexible diaphragm, and selectably introducing a pressure medium into the cavity when it is desired to close the valve.

3 Claims, 5 Drawing Sheets

PRESSURE-ACTUATED NORMALLY OPEN FLUID VALVE

RELATED CASES

This application claims the benefit of U.S. Provisional Application No. 60/571,339, filed 15 May 2004 and entitled CONVERTED SOLENOID VALVES FROM NORMALLY CLOSED TO NORMALLY OPEN AND FROM ELECTRICALLY OPERATED TO NON-ELECTRICALLY OPERATED and U.S. Provisional Application No. 60/571,828, filed-17 May 2004 and entitled METHOD AND APPARATUS FOR SELF CLEANING BACK FLUSH FILTER, both of which name Robert S. Bosko as the sole inventor and the entire contents of both are incorporated herein by reference.

FIELD OF THE INVENTION

This invention relates to fluid valves, and more particularly to a modification of a standard normally closed solenoid valve that allows it to function as a normally open valve controlled by fluid pressure rather than electricity.

BACKGROUND OF THE INVENTION

There are numerous industrial and commercial applications where it is desirable to control a flowing fluid with an inexpensive normally open non-electric valve, as opposed to the commonly employed normally closed solenoid type of valve. For example, small water purification systems using reverse osmosis membranes are useful in localities where the water quality is poor and conventional solenoid valve mechanisms tend to become clogged with mineral deposits. It is precisely in those locations, however, that electrical power supplies tend to be spotty and expensive, so that reliance on electrical power is prone to shut off the water even though the water mains are still under pressure. In such localities, cost also tends to be a major factor in equipment selection and operation, a consideration that is exacerbated by the fact that holding a common solenoid valve open uses electricity continuously, and the fact that specially designed non-electrical normally open valves are expensive.

Another situation in which inexpensive non-electric normally open valves are useful is one in which flammable or explosive liquids need to be conveyed in small, low-cost installations with little supervision and maintenance.

SUMMARY OF THE INVENTION

In accordance with the invention, a standard inexpensive normally-closed solenoid valve is converted to a non-electric normally-open valve operated by air pressure or other pressure media, by substituting for the solenoid coil and plunger a flexible, fluid-tight diaphragm which is normally pushed away from the valve seat by the conveyed fluid pressing against the inner surface of the diaphragm. When it is desired to stop the fluid flow, compressed air or another suitable pressure medium is applied to the outer surface of the diaphragm so as to push it against the valve seat and shut off the flow.

DESCRIPTION OF THE EMBODIMENT

Figure 1:
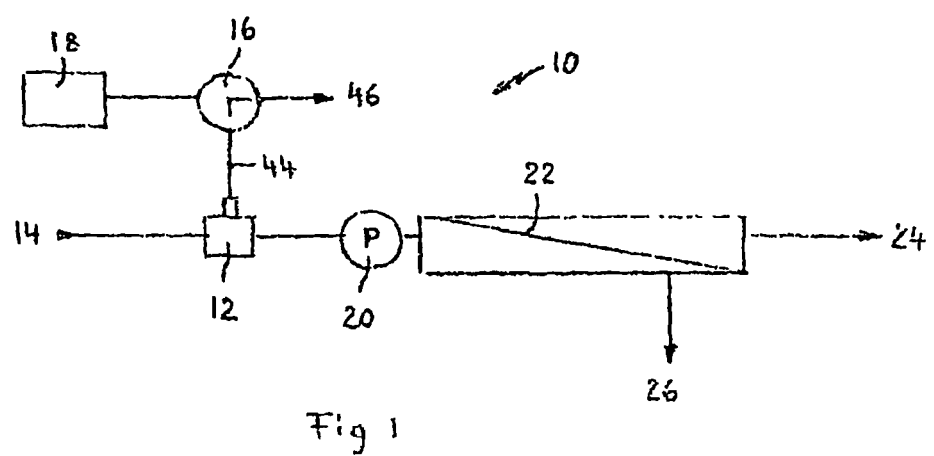
FIG. 1 is a schematic diagram illustrating one use of the invention.

FIG. 1 schematically shows a small water purification system 10 in which the valve 12 of this invention is useful. The system 10 includes a source of feed water 14 (which may be pre-filtered), a small manual or automatic control valve 16, a main valve 12 constructed in accordance with this invention, a source 18 of compressed air or other pressure medium, and a pressure boost pump 20 whose output is applied to a reverse osmosis membrane 22. The output of the membrane 22 is the purified water supply 24, and the residual concentrate is discharged to drain 26.

Figure 2:
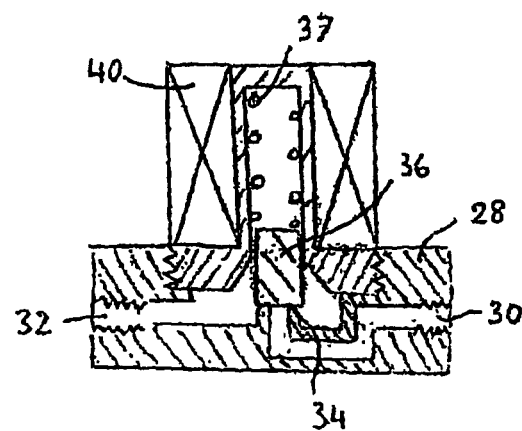
FIG. 2 is a schematic axial cross section showing a conventional solenoid valve in its normally closed position.
Figure 3:
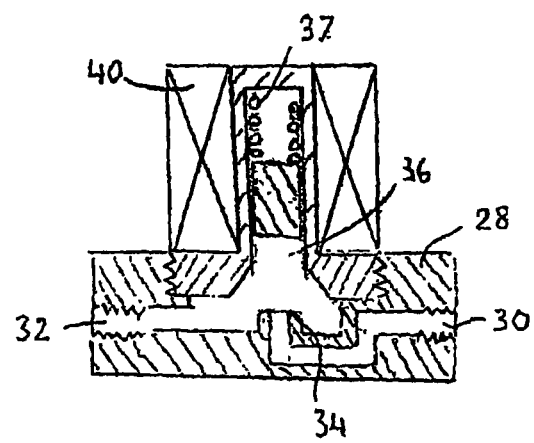
FIG. 3 is a schematic axial cross section of the same valve in its powered open position.

In accordance with the invention, the main valve 12 is a modified version, as described hereafter, of a conventional inexpensive solenoid valve commonly available in hardware stores for use in domestic sprinkler systems. Although the specific structure of these valves varies from manufacturer to manufacturer, in their simplest form they all work in essentially the same way. As best seen in FIGS. 2 and 3, they have a body 28 with an inlet 30 and an outlet 32. Water flows from the inlet 30 to the outlet 32 through an apertured valve seat 34. A plunger 36 is biased against the valve seat 34 by a spring 37 (FIG. 2) but can be pulled up into the central cavity of the housing and away from the valve seat 34 by the solenoid coil 40 (FIG. 3) when the coil 40 is energized.

Figure 4:
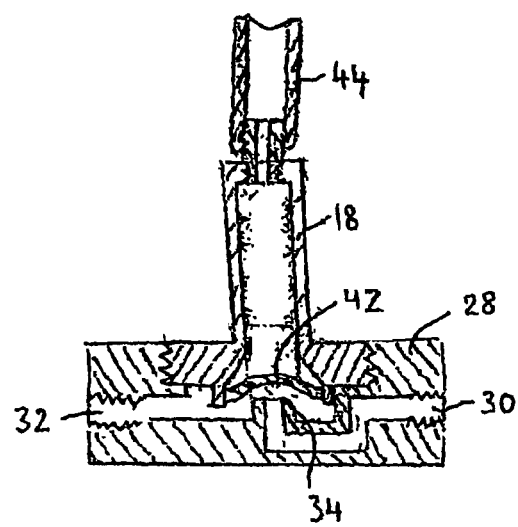
FIG. 4 is a schematic axial cross section of the valve of FIG. 2, as modified in accordance with the invention, in its normal open position.
Figure 5:
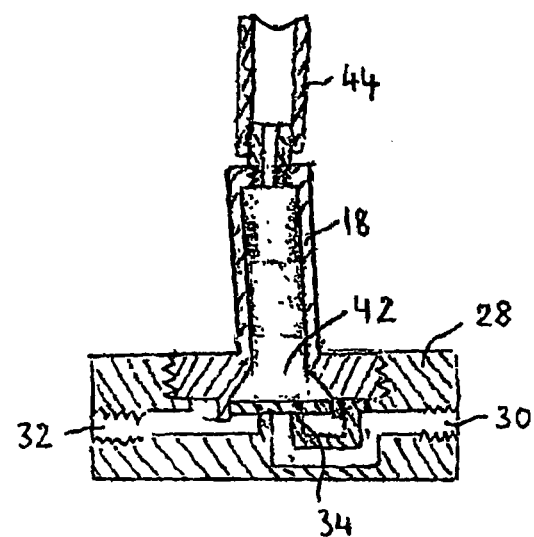
FIG. 5 is a cross section like FIG. 4 but showing the valve in its pressurized closed position.

The valve 12 in the system of FIG. 1 is modified as shown in FIGS. 4 and 5. The plunger 36, spring 37 and solenoid coil 40 have been removed, and the lower end of the housing has been closed off by a flexible diaphragm 42. An external pressure line 44 has been connected to the top of the housing, and a passage has been formed in the top of housing to let the pressure line 44 communicate with the interior of housing.

As seen in FIG. 4, as long as there is no pressure in the pressure line 44 (control valve 16 set to connect line 44 to atmosphere through vent 46), the diaphragm 42 is pushed away from the valve seat 34 by the pressure of the water flowing through the valve 12, and the valve 12 remains open. When the control valve 16 is now turned to interconnect the line 44 with the compressed air tank 18, the resulting air pressure in line 44 forces the diaphragm 42 against valve seat 34 and shuts off the water flow through the main valve 12.

It will be noted that if the air path is properly sealed and the valve 16 is turned to a position preventing any escape of air from line 44, the pressurization of line 44 can be maintained indefinitely without any need for additional compressed air, thus making the operation of the inventive system very economical. It will also be noted that since the flexible diaphragm 42 (which may be made of rubber or other similar suitable material) is the only moving part in valve 12, hazardous friction between metal parts is avoided when flammable or explosive fluids are being conveyed.

Although the invention has been described in connection with a specific embodiment, it will be understood that the inventive concept is not limited thereby but may be carried out in a variety of forms limited only by the appended claims.

I claim:

1. A method of converting a normally closed electric solenoid valve to a non-electrically operated normally open valve, comprising providing said solenoid valve including a flow path through a valve seat, a housing extending from said valve seat, and a plunger normally spring-biased into valve-closing contact with said valve seat but retractable into a cavity in said housing by energizing a solenoid coil to open said valve, and comprising the steps of:
  a) removing said spring-biased plunger;
  b) modifying said housing to allow the selective introduction of a pressure medium into said cavity;
  c) sealing closing off said cavity from said flow path with a diaphragm sufficiently flexible to normally be pushed off said valve seat by the pressure of a fluid flowing in said flow path; and
  d) selectively introducing a pressure medium into said cavity so as to bias said diaphragm into contact with said valve seat when it is desired to close the valve.

2. The method of claim 1, in which said pressure medium is compressed air and said fluid is water.

3. The method of claim 1, in which said solenoid coil is also removed.

\* \* \* \* \*